United States Patent
Boiocchi et al.

(10) Patent No.: US 6,555,212 B2
(45) Date of Patent: Apr. 29, 2003

(54) REINFORCING FABRIC FOR AN ARTICLE MADE FROM ELASTOMERIC MATERIAL AND CORRESPONDING ARTICLE COMPRISING THIS FABRIC

(75) Inventors: Maurizio Boiocchi, Segrate (IT); Gurdey Orjela, Arlon (BE)

(73) Assignee: Pirelli Coordinamento Pneumatici S.p.A., Milan (IT)

( * ) Notice: Subject to any disclaimer, the term of this patent is extended or adjusted under 35 U.S.C. 154(b) by 151 days.

(21) Appl. No.: 09/859,397

(22) Filed: May 18, 2001

(65) Prior Publication Data

US 2001/0042581 A1 Nov. 22, 2001

Related U.S. Application Data

(62) Division of application No. 09/166,920, filed on Oct. 6, 1998, now Pat. No. 6,257,291.

(30) Foreign Application Priority Data

Oct. 6, 1997 (EP) .............................. 97830499

(51) Int. Cl.⁷ .............................. B32B 25/02; B60C 9/00
(52) U.S. Cl. ................................... 428/295.4; 152/451
(58) Field of Search .............................. 152/451, 527, 152/556, 542, 543, 531; 428/295.4, 295.7, 296.1, FOR 103; 156/176–179, 906, 907; 442/59, 60, 327, 334, 366

(56) References Cited

U.S. PATENT DOCUMENTS 3,040,797 A    6/1962   Saint Paul
3,616,832 A   11/1971   Shima et al.
3,929,180 A   12/1975   Kawase et al.
3,989,083 A   11/1976   Chrobak
4,006,766 A    2/1977   Takayanagi et al.
4,739,814 A    4/1988   Berczi et al.
5,695,578 A * 12/1997   Boiocchi et al. ........ 152/527 X

FOREIGN PATENT DOCUMENTS

EP   0412928 B1       2/1991
EP   0728598 A1  *    8/1996   ................ 152/527
FR   2.536.017         5/1984
FR   2.542.673         9/1984
GB   2006694 A         5/1979
GB   2160158 A        12/1985

* cited by examiner

*Primary Examiner*—Adrienne C. Johnstone
(74) *Attorney, Agent, or Firm*—Finnegan, Henderson, Farabow, Garrett & Dunner, L.L.P.

(57) ABSTRACT

A rubberized reinforcing fabric for articles made from elastomeric material includes a plurality of textile cords having at least tensile strength, parallel and adjacent to each other in a same direction, and incorporated in an elastomeric material. The cords have a count between 420/2 dTex and 840/2 dTex, a diameter between 0.33 mm and 0.47 mm, and are embedded in the fabric. The fabric has a thickness of not more than 0.8 mm and a density between 125 cords/dm and 280 cords/dm. The cords constitute a maximum of 40% of a volume of the fabric. An article made from elastomeric material, including at least one rubberized reinforcing fabric made from elastomeric material, is also disclosed.

18 Claims, 1 Drawing Sheet

REINFORCING FABRIC FOR AN ARTICLE MADE FROM ELASTOMERIC MATERIAL AND CORRESPONDING ARTICLE COMPRISING THIS FABRIC

CROSS-REFERENCES TO RELATED APPLICATIONS

This application is a divisional of U.S. patent application Ser. No. 09/166,920, filed Oct. 6, 1998, in the U.S. Patent and Trademark Office, now U.S. Pat. No. 6,257,291 B1, the contents of which are relied upon and incorporated herein by reference.

BACKGROUND AND BRIEF SUMMARY OF THE INVENTION

The present invention relates to articles made from elastomer-based material, defined in a general way in the remainder of the present description as elastomeric material or rubber compound; it relates specifically to the rubberized fabrics used for making the said articles and the corresponding reinforcing elements, and is more particularly concerned with pneumatic tires for vehicle wheels.

Rubberized fabrics are a semi-finished product of the greatest importance for the manufacture of products from elastomeric material: in general, they comprise a plurality of filamentary reinforcing elements having at least tensile strength, all being disposed parallel and adjacent to each other, and completely embedded in a sheet of rubber compound.

The said fabric is produced in the form of a continuous piece whose length is indefinite, in other words is far greater than its width, by incorporating in a layer of rubber compound, by known means and processes, the said reinforcing elements orientated in the longitudinal direction of the piece.

The piece is then cut transversely into portions of various sizes, with an angle of cut predetermined as necessary, and these portions are joined side by side to produce a continuous strip of fabric with reinforcing elements orientated at an angle of predetermined value with respect to the longitudinal direction of the strip.

Portions of appropriate size of the said strip form the textile elements used in the making of the product, assembled with other constituent elements of the product: for example, in the case of a pneumatic tire, as will be seen subsequently, these textile elements form the casing ply, the belts, rims, loops and other reinforcing fabrics disposed in various ways in the structure of the pneumatic tire.

The use of rubberized fabric enables the reinforcing elements to be disposed within the structure of the product, by the desired method and in the desired position, in a precise, simple and economical way.

The said filamentary reinforcing elements may be made from many different materials, textile or metal, natural or synthetic, and may consist either of monofilaments, in other words single wires or strands, or bundles of monofilaments placed together, or cords comprising a plurality of strands or bundles of monofilaments wound spirally with respect to each other in predetermined configurations.

In the present description, the word "wire" denotes the normal metal wire used in pneumatic tire technology, while the word "monofilament" or "floss" denotes textile fibres, natural or synthetic, which are also commonly used in the technology of rubber products.

Articles incorporating these reinforcing fabrics are, for example, pneumatic tires, transmission belts, conveyor belts and hoses for carrying fluids which may be pressurized.

The performance of rubber articles, in terms of service life, mechanical strength and, in the case of pneumatic tires, road performance, depends principally on the mechanical characteristics of the reinforcing elements which have the function of withstanding the stresses put upon it, which, in the case of a pneumatic tire, include the inflation pressure and the stresses arising from use on the road.

The pneumatic tire to which the invention relates comprises, in a general way, a casing of toroidal shape substantially consisting of at least one rubberized fabric (casing ply) having its edges wrapped around a pair of annular metal cores which are circumferentially inextensible (the ordinary bead cores), a tread band disposed on the crown of the said casing and a breaker structure interposed between the casing and the tread, formed by one or more radially superimposed layers of rubberized fabric (belts), wherein the said rubberized fabrics comprise a plurality of reinforcing elements, in other words the conventional cords, which have at least tensile strength, are parallel and adjacent to each other and orientated in a predetermined direction, and are incorporated in a sheet of rubber compound.

More precisely, the cords of the casing ply preferably lie in radial planes including the axis of rotation of the tire, while the cords of the belts preferably lie at angles to each other in adjacent belts and may be orientated parallel to the equatorial plane of the tire in the radially outermost belt.

In tires for motor vehicles, the said cords are preferably of the textile type in the casing ply and in the radially outermost belt, while they are metal cords in the radially innermost belts.

The textile cords are identified by a numerical symbol which represents the count of the fibre used and the number of strands used to form the cord. The term "strand" indicates a bundle of flosses or monofilaments twisted together; the term "count" indicates the weight in grams of a length of 10,000 meters of fibre, expressed in dTex units, or the weight in grams per length of 9000 meters, expressed in deniers.

At the present time, the textile cords used in rubberized fabrics for pneumatic tires comprise two or three strands twisted together and have a count in excess of 900 dTex units: for example, rayon cords with a count of 1840/2, 1840/3 or 2440/2, nylon6 or nylon66 cords with a count of 940/2 and 1400/2, or synthetic fibre (aramid or polyester) cords with a count of 1670/2, 1100/2 or 2440/2 are used for casing fabrics.

Known cords usually have diameters of the order of 0.7 mm and are incorporated in fabrics which have fabric thicknesses of approximately 1 mm, with a density of cords in the fabric of between 60 and 120 cords/dm, in other words cords per decimeter.

Fabrics for pneumatic tires reinforced with the said cords and corresponding tires are described, for example, in U.S. Pat. Nos. 3,616,832 and 3,929,180.

More particularly, U.S. Pat. No. 3,616,832 describes a tire with a radial casing formed by two casing plies provided with rayon cords with a count of 1650/2 denier and a density of 38 cords per 5 cm, in other words 76 cords/dm.

The belt assembly is formed by four fabric belts with rayon cords with a count of 1650/3 denier and 30 cords per 5 cm, in other words 60 cords/dm.

The tire is compared with another tire comprising the same rayon casing and a belt assembly formed by four fabric belts provided with cords of polyethylene naphthalene 2,6-dicarboxylate, known as PEN, with a count of 2000/2 denier, distributed with a density of 30 cords per 5 cm, in other words 60 cords/dm.

The cited patent describes, as an alternative to the rayon casing and with the same breaker structure with PEN cords, further casings with the same number of plies, comprising in one case polyethylene terephthalate, known as PET, fibre cords with a count of 1000/3 denier and a density of 35 cords per 5 cm, in other words 70 cords/dm, and in a second case having nylon6 cords with a count of 1260/2 denier and a density of 33 cords per 5 cm, in other words 66 cords/dm.

U.S. Pat. No. 3,929,180 describes, with a series of comparative examples, two pneumatic tires, both having a radial casing formed by two plies reinforced with 35 cords per 5 cm; the casing of the first tire comprises rayon cords having a count of 1650/3 denier, and that of the second has PEN cords with a count of 2000/2 denier. In both tires, the belt assembly is formed by four fabric belts with PEN cords having a count of 1000/2 denier, distributed with a density of 35 cords per 5 cm.

Given all this, the present development of pneumatic tire technology towards increasingly specialized products capable of providing increasingly high performance is a powerful stimulus to the search for increasingly lightweight tires.

In this context, the applicant became aware that one contribution to the solution of the problem might lie in the reduction of the weight of the pneumatic tire casing, though naturally without negative effects on the characteristics of mechanical strength and of the behaviour of the tire in use, and particularly on directional stability and comfort.

In this regard, it should be noted that the problem faced here is neither simple nor obvious, since the present tendency in pneumatic tire technology is to maintain the present weights of the reinforcing fabrics instead of decreasing them, particularly in respect of fabrics reinforced with textile cords and even more particularly in respect of the casing plies.

The reason for this is that in present-day rubberized fabrics, the percentage by volume of the reinforcing elements is at least 45% of the total volume of the fabric, and this percentage cannot apparently be reduced without incurring the risk of compromising the mechanical strength of the tire and/or its quality.

Where the reinforcing cords are concerned, at the present time these have the counts cited above, corresponding to diameters of not less than 0.7 mm. The use of lower counts is not recommended, since a return to the aforesaid volume of strong material would require densities such that adequate rubberizing of the cords, particularly between the axially adjacent cords, would be impossible.

On the other hand, it is also considered to be impossible to reduce the quantity of rubber in the fabric, which is already so thin that it cannot be reduced further without leaving the reinforcing cords at least partially uncovered by the rubber, with all the consequent disadvantages in terms of quality and risks in terms of safety for the finished product.

Given the present state of the art, the applicant has unexpectedly found that, by reducing both the count and the percentage by volume of the said reinforcing elements having at least tensile strength with respect to the total volume of the fabric, it is possible to increase or at least maintain the performance of the said articles, while obtaining in each case an advantageous reduction of the weight of the articles made from elastomeric material comprising this rubberized fabric.

This characteristic of the invention is unexpected, in that an improvement of mechanical strength and performance associated with a decrease in the percentage by volume of the strong part of the fabric, consisting solely of the filamentary reinforcing elements incorporated in the elastomeric matrix, was not predictable, the rubber compound being commonly considered to be lacking in tensile strength.

The result obtained is therefore unexpected: after the detailed description of embodiments according to the invention, a possible technical explanation of the improvements found will be given.

For the purposes of the present invention, the percentage by volume of the reinforcing elements is found, with reference to the cross section of a fabric layer of unit width, by relating the volume of the reinforcing elements (the density of the elements multiplied by $\pi/4$ of the square of their diameter) to the total volume of the fabric (the thickness of the rubber sheet covering the reinforcing elements on both surfaces of the fabric added to the diameter of the reinforcing element).

Again, for the purposes of the present invention, the significant volume of the fabric, with respect to which the critical values identified and described below are calculated, with reference to the finished product, is that of a fabric which has a total thickness of 0.8 mm, with an identical thickness of compound on both surfaces of the layer of adjacent cords.

In a first aspect, the invention therefore relates to a rubberized reinforcing fabric for articles made from elastomeric material and similar, comprising a plurality of filamentary elements having at least tensile strength, parallel and adjacent to each other and incorporated in an elastomeric material, characterized in that the said filamentary elements constitute a maximum of 40%, and more preferably not more than 35%, of the volume of the said fabric.

Preferably the said filamentary reinforcing elements are textile cords with a count of between 420/2 and 840/2 dtex; the said cords are incorporated in the rubberized fabric with a density of not less than 125 cords/dm, in other words 125 cords per decimeter of width of the fabric, and more preferably between 125 and 280 cords/dm, in such a way as to provide an adequate tensile strength. Preferably the fabric incorporating the said cords has a total thickness of less than 0.8 mm.

In a preferred embodiment the rubberized fabric comprises a plurality of textile cords parallel and adjacent to each other, incorporated in the elastomeric material of the fabric, and is characterized in that the said cords have a count of 550/2 dTex.

Preferably they are distributed in the fabric with a density of between 128 and 224 cords/dm.

In a different aspect, the invention relates to various articles made from elastomeric material which comprise this reinforcing fabric, for example transmission belts, hoses for fluids and conveyor belts, and in particular pneumatic tires, with which the invention is particularly concerned.

According to a third aspect, the invention relates to a pneumatic tyre for a vehicle wheel, reinforced with rubberized fabric strips, which comprises a casing of toroidal shape substantially consisting of at least one casing ply formed by a rubberized fabric whose axially opposite edges are wrapped around a pair of bead cores, for anchoring the tyre to a corresponding mounting rim, a tread band disposed on the crown of the said casing and a breaker structure interposed between the casing and the tread band and formed by one or more radially superimposed belts of rubberized fabric, wherein at least one of the said strips of rubberized fabric comprises a plurality of textile reinforcing cords which have at least tensile strength, are parallel and adjacent to each other and oriented in a predetermined direction, are incorporated in a sheet of rubber compound, and have a count between 420/2 dTex and 840/2 dTex.

In a preferred embodiment, the count of the said cords is 550/2 dtex.

Preferably the said textile cords are distributed in the said fabric with a density of not less than 125 cords/dm. Advantageously, the said textile cords are made from PEN or PET material or aramid fibres.

In a preferred embodiment of the tire, the said rubberized fabric constitutes the casing ply and comprises the said cords disposed preferably in radial planes including the axis of rotation of the tire.

In a second preferred embodiment of the tire, the breaker structure comprises at least one belt of rubberized fabric reinforced with the said cords, the belt being preferably disposed in the radially outermost position, with the cords more preferably orientated in the circumferential direction.

According to alternative forms of preferred embodiments, the casing of the said tire comprises other strips of the said rubberized fabric, for example folded in a loop around at least one bead core or as a reinforcing tape in a position axially outside the said bead cores.

BRIEF DESCRIPTION OF THE DRAWINGS

The present invention will subsequently be described, solely by way of an example, without any purpose of restriction, with reference to some embodiments, as shown in the attached figures, in which.

DETAILED DESCRIPTION OF THE INVENTION

Figure 1:
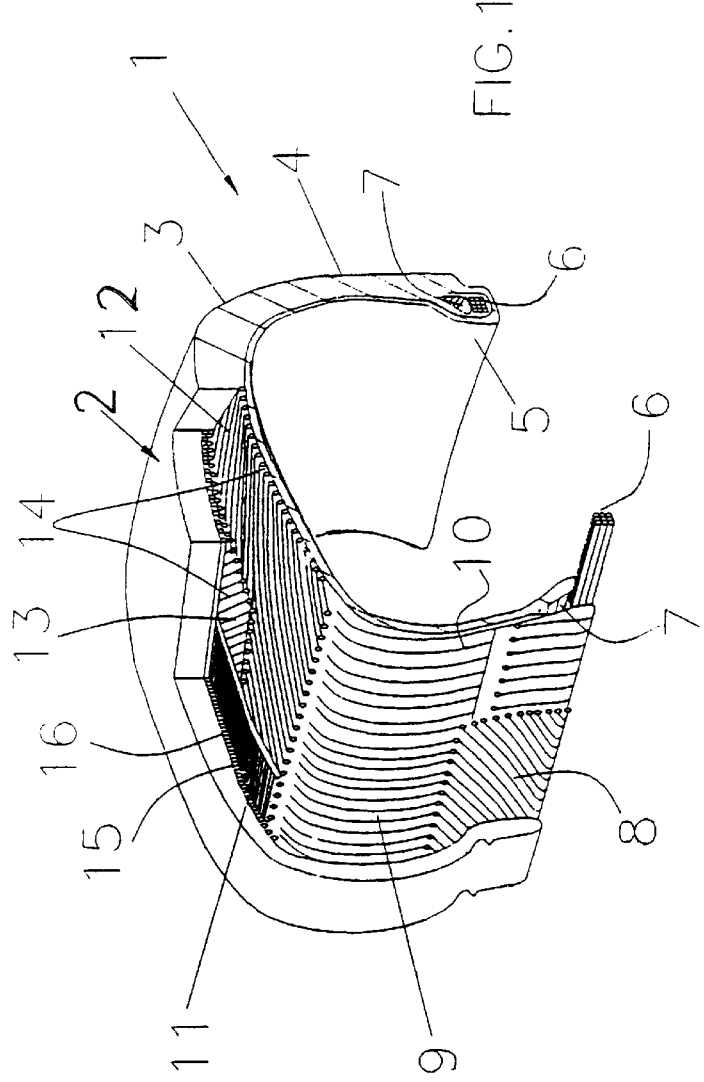
FIG. 1 shows a partial perspective view, with parts removed, of a radial tire comprising at least one reinforcing fabric according to the invention.

In FIG. 1 the number 1 indicates a pneumatic tire comprising, in a known way, a casing of toroidal shape, having a crown portion, shoulders 3, sidewalls 4 and beads 5, each incorporating a bead core 6, a bead filler 7, applied in a radially external position to the said bead core, and a reinforcing tape 8 in a position axially outside the bead core. The casing is preferably of the radial type and comprises a casing ply formed by a rubberized fabric 9 incorporating in the elastomeric material a plurality of reinforcing cords 10 disposed in meridian planes of the tire.

A tread band 2 is disposed on the crown of the said casing, and a breaker structure 11 is disposed between the tread strip and the casing.

The breaker structure comprises at least three belts of rubberized fabric, of which the first two 12, 13, radially innermost, incorporate in the elastomeric material metal cords 14 disposed parallel to each other in each belt, and crossing over those in the adjacent belt, inclined to the equatorial plane at angles of preferably between 5° and 35° to the said plane. A third belt 15 in a radially outermost position incorporates polyamide cords 16 orientated substantially as the equatorial plane, the whole being done in a known way.

In the following examples of embodiments of the invention, the rubberized fabric of the casing ply incorporates cords made from polyethylene naphthalene 2,6-dicarboxylate, more commonly known as PEN material; the elastic modulus of the fabric is calculated by multiplying the value of the modulus of the individual cord, measured between 20N and 45N, by the density of the cords.

EXAMPLE 1

Figure 2:
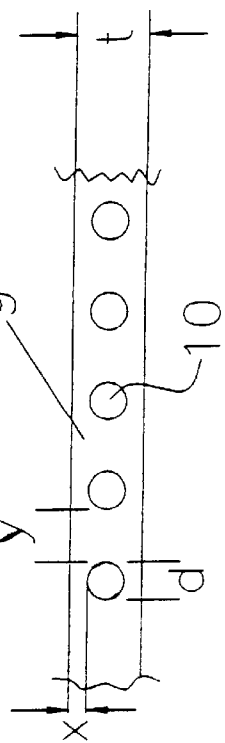
FIG. 2 shows in partial transverse section a fabric according to the invention for the tire shown in FIG. 1.

Table 1 shows the data defining the fabric 9 of the casing ply according to the invention, while FIG. 2 shows the corresponding geometrical dimensions of the fabric seen in partial transverse section, namely the values "d" (diameter of the cord), "t" (total thickness of the fabric) "x" (thickness of the rubber sheet which covers the layer of the said cords on both surfaces) and "y", in other words the interval between adjacent cords.

TABLE 1

| Casing fabric | | |
|---|---|---|
| Count of the cord | (PEN fibres) | 550/2 dTex |
| Total count | (2 strands of twisted fibres) | 1100 dTex |
| Twists per strand | (Twists/dm) | 48 |
| Cord density | (cords/dm) | 224 |
| Percentage by volume of cords in the fabric | "PC %" | 33% |
| Thickness "t" of the fabric | (mm) | 0.67 |
| Diameter "d" of the cord | (mm) | 0.35 |
| Distance "x" between cord and fabric surface | (mm) | 0.16 |
| Distance "y" between adjacent cords in the fabric | (mm) | 0.08 |
| Elastic modulus of the fabric | (MPa/cm) | 190,608 |
| Breaking load of the fabric | (N/cm) | 1,747 |

EXAMPLE 2

In a second embodiment, the casing fabric 9 is made with cords of the same material (PEN) and of the same diameter, and with the same elastomeric composition as those of the preceding example, but with a decrease of the cord density as compared with the fabric of Example 1, and consequently of the percentage by volume of the strong material in the fabric, as shown in Table 2, giving the results shown therein.

TABLE 2

| Casing fabric | | |
|---|---|---|
| Count of the cord | (PEN fibres) | 550/2 dTex |
| Total count | (2 strands of twisted fibres) | 1100 |
| Twists per strand | (Twists/dm) | 48 |
| Cord density | (cords/dm) | 128 |
| Percentage by volume of cords in the fabric | "PC %" | 19% |
| Thickness "t" of the fabric | (mm) | 0.67 |
| Diameter "d" of the cord | (mm) | 0.35 |
| Distance "x" between cord and fabric surface | (mm) | 0.16 |
| Distance "y" between adjacent cords in the fabric | (mm) | 0.42 |
| Elastic modulus of the fabric | (MPa/cm) | 108,918 |
| Breaking load of the fabric | (N/cm) | 998 |

EXAMPLE 3

In a third embodiment, the casing fabric 9 is made with cords of the same material (PEN) and of the same diameter, and with the same elastomeric composition as those of the preceding example, but with a cord density and consequently a percentage by volume of the strong material, having values intermediate between those cited previously, as shown in Table 3 below, giving the results shown therein.

TABLE 3

Casing fabric

| | | |
|---|---|---|
| Count of the cord | (PEN fibres) | 550/2 dTex |
| Total count | (2 strands of twisted fibres) | 1100 dTex |
| Twists per strand | (Twists/dm) | 48 |
| Cord density | (cords/dm) | 197 |
| Percentage by volume of cords in the fabric | "PC %" | 29% |
| Thickness "t" of the fabric | (mm) | 0.67 |
| Diameter "d" of the cord | (mm) | 0.35 |
| Distance "x" between cord and fabric surface | (mm) | 0.16 |
| Distance "y" between adjacent cords in the fabric | (mm) | 0.14 |
| Elastic modulus of the fabric | (MPa/cm) | 167,633 |
| Breaking load of the fabric | (N/cm) | 1,537 |

In the preceding examples, the composition of the fabric rubberizing compound is not specified, since it has no effect for the purposes of the present invention. In any case, the rubberizing compound is always the same in all the cited examples of embodiments and in the control fabric which will be described subsequently.

Further embodiments of the invention may comprise rubberized fabrics reinforced with cords of aramid and other textile materials, such as polyethylene terephthalate, known by the abbreviation PET, polyvinyl alcohol, known by the abbreviation PVA, and similar.

The cords may have counts different from that cited in the preceding examples, preferably not less than 420/2 dTex and not more than 840/2 dTex.

Fabrics having cords made from aramid, particularly poly-(p-phenylene-terephthalamide), and having counts of 420/2 dTex and 840/2 dTex, may have the values shown in Tables 4 and 5 respectively, the symbols used in the said tables being the same as those in the preceding tables:

TABLE 4

Fabric with aramid cords with a count of 420/2

| t (mm) | y (mm) | x (mm) | d (mm) | cords/dm | PC % |
|---|---|---|---|---|---|
| 0.61 | 0.08 | 0.165 | 0.33 | 278 | 39% |
| 0.61 | 0.42 | 0.165 | 0.33 | 143 | 20% |
| 0.61 | 0.14 | 0.165 | 0.33 | 238 | 33% |

TABLE 5

Fabric with aramid cords with a count of 840/2

| t (mm) | y (mm) | x (mm) | d (mm) | cords/dm | PC % |
|---|---|---|---|---|---|
| 0.71 | 0.08 | 0.165 | 0.47 | 213 | 34% |
| 0.71 | 0.42 | 0.165 | 0.47 | 125 | 29% |
| 0.71 | 0.14 | 0.165 | 0.47 | 190 | 39% |

A comparison will now be made, in Table 6 below, of the data and results for a casing fabric made according to the present state of the art, in other words from rayon with a count of 1840/2 dTex, and the data and results of the fabrics according to the invention found in Examples 1, 2 and 3.

The table also shows the percentage variations (Δ%) of the parameters of the fabrics of the examples with respect to the known fabric: in all these fabrics, the thickness "x" is identical, being 0.16 mm.

The data in Table 6 show particularly clearly the reduction of the percentage by volume of strong material, in other words of the cords, in each of the three embodiments of a fabric according to the invention by comparison with the control fabric.

TABLE 6

| Rubberized fabric | | known | Table 1 | Table 2 | Table 3 |
|---|---|---|---|---|---|
| Cord material | | rayon | PEN | PEN | PEN |
| Count | (dTex) | 1840/2 | 550/2 | 550/2 | 550/2 |
| Density | (cords/dm) | 120 | 224 | 128 | 197 |
| Percentage of cords by volume | (PC %) | 45% | 33% | 19% | 29% |
| | Δ% | | −26.7% | −57.8% | −35.6% |
| Thickness "t" | (mm) | 1.00 | 0.67 | 0.67 | 0.67 |
| | Δ% | | −33% | −33% | −33% |
| Cord diameter "d" | (mm) | 0.68 | 0.35 | 0.35 | 0.35 |
| | Δ% | | −48.5% | −48.5% | −48.5% |
| Distance "y" | (mm) | 0.14 | 0.08 | 0.42 | 0.14 |
| | Δ% | | −42% | 191% | 0% |
| Elastic modulus of the fabric | (MPa/cm) | 111,432 | 190,608 | 108,918 | 167,633 |
| | Δ% | | 71% | −2% | 50% |
| Breaking load of the fabric | (N/cm) | 1,800 | 1,747 | 998 | 1,537 |
| | Δ% | | −3% | −45% | −15% |

It can easily be seen that the reduction of the percentage by volume, PC %, of cord with respect to the known fabric varies quantitatively in a very significant way, ranging from 26% to 57%.

Despite this reduction, the values of the elastic moduli of the fabrics according to the invention are either substantially equal to or far greater than those of the known fabric, and therefore the deformations of the fabrics according to the invention, for equal tensile stress, are of the same order of magnitude as those of the known fabric or advantageously significantly smaller.

In particular, the values of the cord density of the invention in the fabrics of the three preceding examples have been selected in such a way as to provide rubberized fabrics which have, respectively, the same breaking load (Example 1), the same elastic modulus (Example 2) and the same density, in other words the same interval y between the reinforcing cords (Example 3) as the known control fabric.

It can be seen in Table 6 that the fabric of Example 1, for equal breaking load, shows an increase of 71% in the elastic modulus, while the fabric of Example 2, with a substantially equal elastic modulus (−2%), shows a decrease of 45% in the breaking load. Finally, the fabric of Example 3, in which the reinforcing cords are the same distance apart as those of the control fabric, shows an increase of 50% in the elastic modulus and a simultaneous decrease of 12% in the breaking load.

It is important to note that in each of the preceding examples the elastic modulus of the fabrics according to the invention is advantageously between 100,000 MPa/cm and 200,000 MPa/cm.

It should also be noted that the reduction of the values of the breaking load in the fabrics according to the invention does not entail any particular problems in relation to the product in which they are used because, since the breaking load values have to conform to high safety margins, they are very different from the values required in use.

In other words, in the operating conditions of the article and specifically of the pneumatic tire, the tensile stresses to which the rubberized reinforcing fabric is subjected are specified within the first part of the stress-strain curve of the fabric; in other words they are selected to vary between approximately ⅙ and ⅒ of the breaking load of the fabric. The operating loads therefore show a reduction varying between 84% and 90% with respect to the value of the breaking load. On the basis of this consideration, it will be clear that even reductions of the order of 45% of the said load with respect to the known fabric do not constitute an element of risk.

However, it is possible to make casing fabrics according to the invention with a breaking load equal to or greater than 1800 N/cm, and therefore with values comparable with those of known fabrics, by suitable selection of the count and density of the cords, as shown in Example 1. According to a preferred embodiment of the invention, the applicant uses fabrics with aramid cords, with a count of 550/2 dTex and with a density of between 200 and 210 cords/dm, which show a decrease in the breaking load of the order of 5–10% with respect to the breaking load of known fabrics.

A further example is provided by the fabric which is shown in the last row of Table 5 and which comprises aramid cords with a count of 840/2, disposed with a density of 190 cords/dm. Preferably, the breaking load of the fabrics according to the invention will be between 900 N/cm and 2000 N/cm. As stated previously, the counts of the cords according to the invention are preferably between 420/2 and 840/2 dTex.

It is important to note that it has been found that cords with a count of more than 840/2 generally have breaking loads which are higher than necessary, with consequent needless over-design of the materials.

Cords with a count of less than 420/2 may cause problems in the preparation (rubberizing) of the corresponding fabrics in relation to the possibility of obtaining the high values of density necessary to provide the requisite strength loads, in other words the requisite values of the elastic modulus of the material. In this respect, the interval between adjacent cords in the fabrics according to the invention is preferably between 0.05 and 0.50 mm. Within the range of counts from 420/2 to 840/2 dTex, the invention offers a range of reinforcing fabrics in which, while there is a significant reduction in the percentage by volume of strong material (in other words, cords), the values obtained for mechanical performance in use are equal to values advantageously greater than those for known fabrics.

The fabrics described in Examples 1–5 with reference to the construction of the casing 9 in FIG. 1 may also be advantageously applied in other reinforcing structures; for example they may constitute the outermost belt of the belt assembly 16 comprising cords circumferentially oriented with respect to the tire.

In a different embodiment of the preceding breaker structure, it is possible to replace a single belt of the fabric with circumferential cords, extending over the whole width of the belt assembly, with at least two tapes of the same fabric, of smaller width, disposed laterally.

In other embodiments of the pneumatic tire according to the invention, the said fabrics may constitute a reinforcing tape 8 disposed in an axially outermost position with respect to the bead cores 6, and a circumferential tape wound in a loop around the bead core.

According to the invention, the maintenance or improvement of the mechanical performance in operation is achieved with a remarkable reduction of the weights concerned, as may immediately be appreciated by a comparison of the numerical data relating to the cords and to the corresponding fabrics of Examples 1–5, with particular reference to the reduction of thickness of the fabric, substantially between 30% and 40%, achieved in the fabrics according to the invention. In this respect, in the said fabrics the thickness "x" of the sheet of rubber compound which covers both sides of the layer of cords has a value which is preferably between 0.1 and 0.2 mm.

In particular, it should be noted that the weight per square meter of the known fabric is 1100 g/m² (grams per m²), while the weights of the fabrics of Examples 1, 2 and 3 are between 500 g/m² and 900 g/m² (840 g/m², 540 g/m², and 820 g/m² respectively).

More particularly, among radial pneumatic tires of the size 235/40ZR18, 215/45ZR18, 275/40ZR18, 225/40ZR18 and 265/35ZR18, those of known types have a total weight of the casing plies between 1400 g and 1970 g, while those according to the invention, constructed with the materials stated in the preceding examples, have casing plies with a total weight of between 970 g and 1480 g.

In general, therefore, radial casings made for pneumatic tires according to the invention provide the advantage of a weight reduction of between 25% and 30% compared with conventional casings.

All this provides the advantage of a reduction of the rotating mass for equal performance, by simultaneously providing a considerable weight reduction and an improvement of the mechanical performance, as stated below.

The result is entirely unexpected in that the reduction in the percentage by volume of the cords in the fabric, producing a decrease in the strong material and an increase in the less strong material, in other words the rubberizing compound, should have caused a worsening, rather than an improvement, of the mechanical characteristics.

It has also been found that the fabrics according to the invention show an improvement in fatigue resistance compared with the fabrics according to the known art.

The applicant considers that the reasons for this improvement may be found in the explanations which are given below, although these do not constitute any restriction or limit on the present invention.

Figure 3:
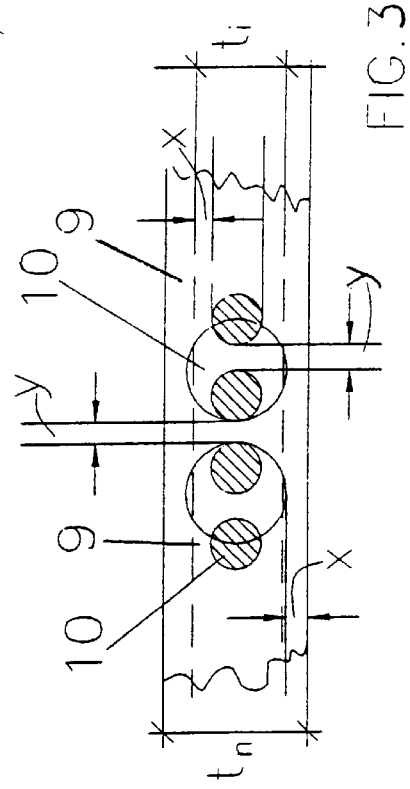
FIG. 3 shows simultaneously in transverse section the fabric according to the invention in comparison with the fabric according to the prior art.

To elucidate these explanations, FIG. 3 shows, in transverse section, the known fabric having a thickness $t_n$ of 1 mm and provided with 0.7 mm diameter cords, and an example of an embodiment of the fabric according to the invention, having a thickness $t_i$ of 0.65 mm, in which the cord diameter is 0.35 mm. The values of the distance "x" between the surfaces delimiting the fabric and the adjacent surfaces tangent to the layer of the said cords which are parallel and adjacent to each other, in other words the thickness of the rubberizing sheet of the layer, and of the interval "y" between adjacent cords, described previously, are maintained at 0.15 mm in both fabrics.

It should be noted that the reinforcing fabrics of a pneumatic tire, in particular the casing ply and the belts of the belt assembly, when changing from the non-deformed to the deformed state in the area of the footprint of the tire, undergo a cyclical flexing deformation which affects both the reinforcing cords and the rubber of the fabric.

The flexing resistance of the cords increases with the diameter, and the flexing resistance of the fabric also increases with its thickness.

The cords of the fabric according to the invention, owing to the lower count, have a smaller diameter than those according to the known art, and the rubber layer of the rubberized fabric as a whole has a smaller thickness than normal fabrics, as may be seen in the preceding tables and in the corresponding explanations provided.

Consequently, it is considered that, owing to their smaller size, the fabrics according to the invention and their reinforcing cords more easily withstand the repeated flexion due to the flattening of the tire in the area of the footprint, with consequently reduced hysteresis losses in the textile material and in the rubber. This also causes less development of heat in the structure, providing an improved fatigue resistance overall.

The invention may also be extended to textile cords orientated in a different way than in radial casings; in particular, the cords according to the invention may be applied to casings known as "cross-ply" casings as well as to casings of tubular type, in other words those without bead wires or at any rate not wrapped around the bead wires.

What is claimed is:

1. A rubberized reinforcing fabric for articles made from elastomeric material, comprising a plurality of textile cords having at least tensile strength, parallel and adjacent to each other in a same direction, and incorporated in an elastomeric material; wherein the cords have a count between 420/2 dTex and 840/2 dTex, a diameter between 0.33 mm and 0.47 mm, and are embedded in the fabric; wherein the fabric has a thickness of not more than 0.8 mm and a density between 125 cords/dm and 280 cords/dm; and wherein the cords constitute a maximum of 40% of a volume of the fabric.

2. The reinforcing fabric of claim 1, wherein the cords comprise polyethylene naphthalene 2,6-dicarboxylate (PEN) fibres.

3. The reinforcing fabric of claim 1, wherein the cords comprise polyethylene terephthalate (PET) fibres.

4. The reinforcing fabric of claim 1, wherein the cords comprise aramid fibres.

5. The reinforcing fabric of claim 1, wherein the fabric has a distance of 0.1 mm to 0.2 mm between a delimiting surface of the fabric and an adjacent surface of the cords lying parallel and adjacent to each other.

6. The reinforcing fabric of claim 1, wherein the fabric has a distance of 0.05 mm to 0.50 mm between one of the parallel and adjacent cords and a next.

7. The reinforcing fabric of claim 1, wherein the fabric has an elastic modulus between 100,000 MPa/cm and 200,000 MPa/cm.

8. The reinforcing fabric of claim 1, wherein the fabric has a breaking load between 900 N/cm and 2000 N/cm.

9. The reinforcing fabric of claim 1, wherein the fabric has a total weight between 500 g/m$^2$ and 900 g/m$^2$.

10. An article made from elastomeric material, comprising at least one rubberized reinforcing fabric made from elastomeric material, wherein the fabric comprises a plurality of textile cords having at least tensile strength, parallel and adjacent to each other in a same direction, and incorporated in an elastomeric material; wherein the cords have a count between 420/2 dTex and 840/2 dTex, a diameter between 0.33 mm and 0.47 mm, and are embedded in the fabric; wherein the fabric has a thickness of not more than 0.8 mm and a density between 125 cords/dm and 280 cords/dm; and wherein the cords constitute a maximum of 40% of a volume of the fabric.

11. The article of claim 10, wherein the cords comprise polyethylene naphthalene 2,6-dicarboxylate (PEN) fibres.

12. The article of claim 10, wherein the cords comprise polyethylene terephthalate (PET) fibres.

13. The article of claim 10, wherein the cords comprise aramid fibres.

14. The article of claim 10, wherein the fabric has a distance of 0.1 mm to 0.2 mm between a delimiting surface of the fabric and an adjacent surface of the cords lying parallel and adjacent to each other.

15. The article of claim 10, wherein the fabric has a distance of 0.05 mm to 0.50 mm between one of the parallel and adjacent cords and a next.

16. The article of claim 10, wherein the fabric has an elastic modulus between 100,000 MPa/cm and 200,000 MPa/cm.

17. The article of claim 10, wherein the fabric has a breaking load between 900 N/cm and 2000 N/cm.

18. The article of claim 10, wherein the fabric has a total weight between 500 g/m$^2$ and 900 g/m$^2$.

* * * * *